(12) United States Patent
Suzuki

(10) Patent No.: US 9,825,562 B2
(45) Date of Patent: Nov. 21, 2017

(54) DRIVE CONTROL DEVICE USING PWM CONTROL OF SYNCHRONOUS RECTIFICATION TYPE

(71) Applicant: RISO KAGAKU CORPORATION, Tokyo (JP)

(72) Inventor: Masao Suzuki, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/172,591

(22) Filed: Jun. 3, 2016

(65) Prior Publication Data

US 2016/0373033 A1 Dec. 22, 2016

(30) Foreign Application Priority Data

Jun. 19, 2015 (JP) .................. 2015-123607

(51) Int. Cl.

| H02P 1/46  | (2006.01) |
| H02P 6/06  | (2006.01) |
| H02P 27/08 | (2006.01) |
| H02P 7/29  | (2016.01) |
| H02P 23/14 | (2006.01) |
| H02P 6/34  | (2016.01) |
| H02P 7/03  | (2016.01) |

(52) U.S. Cl.
CPC .............. *H02P 6/06* (2013.01); *H02P 6/34* (2016.02); *H02P 7/04* (2016.02); *H02P 7/29* (2013.01); *H02P 23/14* (2013.01); *H02P 27/08* (2013.01)

(58) Field of Classification Search
CPC .... H02P 27/08; H02P 6/06; H02P 7/29; H02P 23/14; H02P 21/20
See application file for complete search history.

(56) References Cited

U.S. PATENT DOCUMENTS

| 2009/0039810 A1 | 2/2009 | Gotz et al. |
| 2014/0239854 A1 | 8/2014 | Suzuki |
| 2016/0031478 A1* | 2/2016 | Shiraki ............... B62D 5/0463 |
| | | 701/41 |

FOREIGN PATENT DOCUMENTS

JP 2014-165982 A 9/2014

OTHER PUBLICATIONS

Search Report issued in European Patent Office (EPO) family member Patent Application No. 16173920.6, dated Dec. 6, 2016.
U.S. Appl. No. 15/171,303 to Masao Suzuki, filed Jun. 2, 2016.

\* cited by examiner

*Primary Examiner* — Karen Masih
(74) *Attorney, Agent, or Firm* — Greenblum & Bernstein, P.L.C.

(57) ABSTRACT

A drive control device include a processor and a memory including instructions that, when executed by the processor, cause the processor to perform operations. The operations include: comparing a rotation speed of a motor driven by a PWM control of a synchronous rectification type and a target value of the rotation speed and calculating an error speed; calculating a torque required in the motor based on the calculated error speed; calculating a drive voltage of the motor in the synchronous rectification type based on the calculated torque, the rotation speed of the motor, and an electrical specification of the motor; and setting a duty ratio of a PWM signal in the synchronous rectification type based on the calculated drive voltage.

4 Claims, 18 Drawing Sheets

DRIVE CONTROL DEVICE USING PWM CONTROL OF SYNCHRONOUS RECTIFICATION TYPE

CROSS REFERENCE TO RELATED APPLICATION

This application is based upon and claims the benefit of priority from the prior Japanese Patent Application No. 2015-123607, filed on Jun. 19, 2015, the entire contents of which are incorporated herein by reference.

BACKGROUND

1. Technical Field

The disclosure relates to a drive control device configured to drive a motor.

2. Related Art

A drive control device configured to drive a motor by performing pulse width modulation (PWM) control is known.

Japanese Unexamined Patent Application Publication No. 2014-165982 proposes a drive control device having a motor rotation speed negative feedback loop (primary feedback element) and a motor current negative feedback loop (secondary feedback element).

In normal PWM control, a relationship between a duty-ratio of a PWM signal and a voltage or current is non-linear. Accordingly, the voltage and current cannot be directly converted to the duty ratio of the PWM signal. Hence, the drive control device has the motor current negative feedback loop which detects the current flowing in the motor and causes the duty ratio of the PWM signal to follow the current and converge.

SUMMARY

A current detector is required to form the motor current negative feedback loop described above. Moreover, in a case where digital processing is needed, an AD converter is also required. Accordingly, the hardware configuration of the drive control device is complex.

An object of the disclosure is to provide a drive control device in which the hardware configuration can be simplified.

A drive control device in accordance with some embodiments includes a processor and a memory including instructions that, when executed by the processor, cause the processor to perform operations. The operations include: comparing a rotation speed of a motor driven by a PWM control of a synchronous rectification type and a target value of the rotation speed and calculating an error speed; calculating a torque required in the motor based on the calculated error speed; calculating a drive voltage of the motor in the synchronous rectification type based on the calculated torque, the rotation speed of the motor, and an electrical specification of the motor; and setting a duty ratio of a PWM signal in the synchronous rectification type based on the calculated drive voltage.

According to the aforementioned configuration, the duty ratio corresponding to the error speed can be thereby set without forming a motor current negative feedback loop. Accordingly, it is possible to omit a current detector and an AD converter for forming the motor current negative feedback loop and simplify the hardware configuration.

The electrical specification of the motor may include an inductance of the motor.

According to the configuration described above, a decrease in response performance clue to integral delay of a current caused by the inductance can be suppressed.

The operations may further include: generating a carrier-signal; and generating a PWM signal with the set duty ratio by comparing the generated carrier signal and a PWM setting value corresponding to the drive voltage.

According to the configuration described above, the PWM signal can be generated in a short time. As a result, highly-accurate rotation speed control and quick response to a target speed command is made possible.

DETAILED DESCRIPTION

Figure 1:
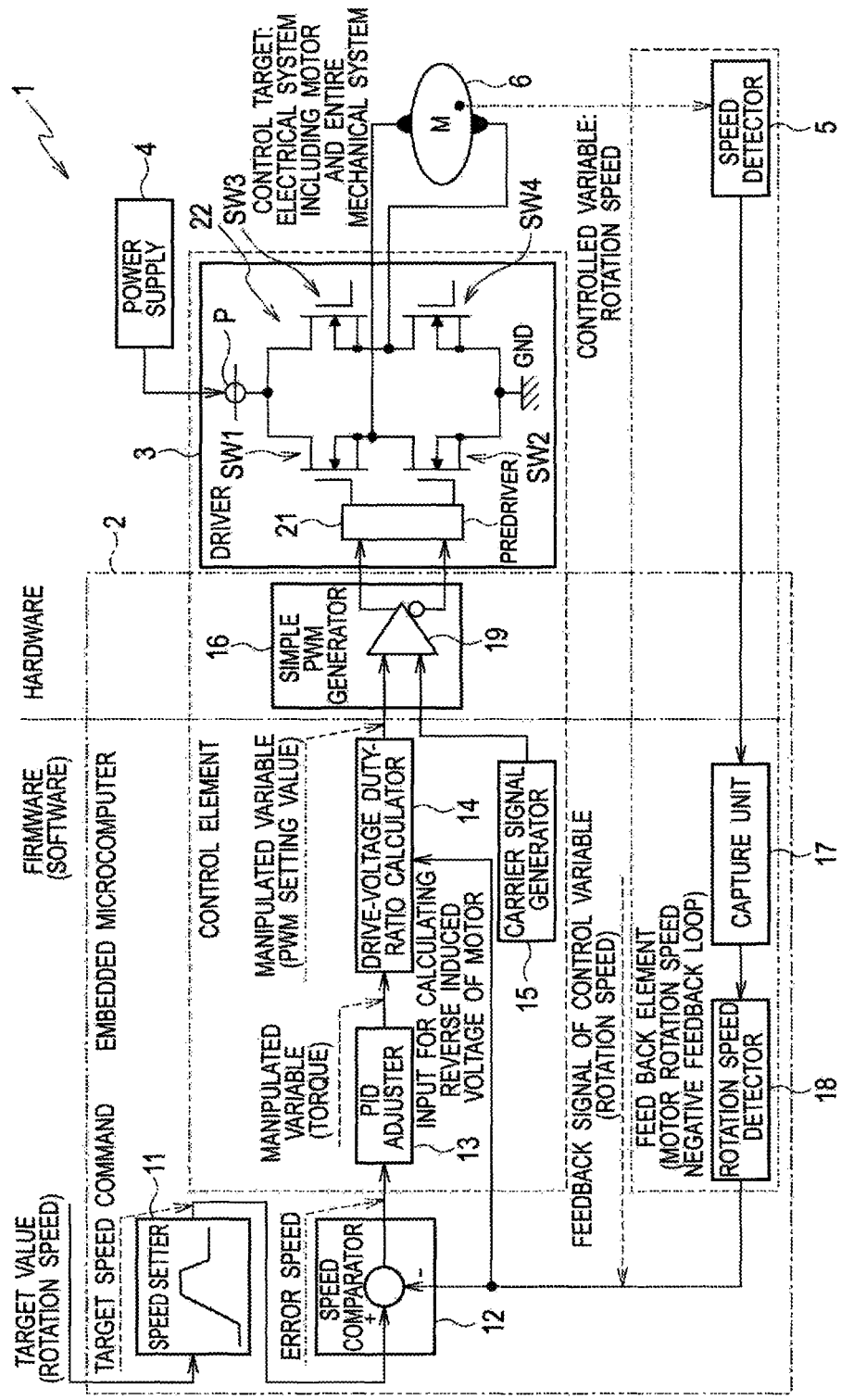
FIG. 1 is a schematic configuration diagram of a drive control device in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

FIG. 1 is a schematic configuration diagram of a drive control device 1 according to an embodiment of the present invention. As illustrated in FIG. 1, the drive control device 1 includes an embedded microcomputer 2, a driver 3, a power supply 4, and a speed detector 5. The drive control device 1 is a device for driving a motor 6 which is a DC motor.

The embedded microcomputer 2 controls the driver 3 by PWM control of a synchronous rectification type. The embedded microcomputer 2 includes a device-embedded digital signal processor (DSP), a central processing unit (CPU), and a storage formed of a semiconductor memory and the like. The storage stores instructions that, when executed by a processor of the DSP or the CPU, cause the processor to perform operations explained below. The storage may be provided outside the embedded microcomputer 2. The embedded microcomputer 2 includes a speed setter 11, a speed comparator 12, a PID adjuster (torque calculator) 13, a drive-voltage duty-ratio calculator (drive voltage calculator, duty ratio calculator) 14, a carrier signal generator 15, a simple PWM generator (PWM generator) 16, a capture unit 17, and a rotation speed detector 18.

The speed setter 11, the speed comparator 12, the PID adjuster 13, the drive-voltage duty-ratio calculator 14, the carrier signal generator 15, the capture unit 17, and the rotation speed detector 18 are implemented by firmware (software) in the embedded microcomputer 2. The simple PWM generator 16 is a unit built in the embedded microcomputer 2 as hardware.

The speed setter 11 outputs a target speed command indicating a target value of a rotation speed of the motor 6 to the speed comparator 12. The target value is inputted into the speed setter 11 from the outside.

The speed comparator 12 compares the rotation speed of the motor 6 and the target value and calculates an error speed which is the difference therebetween. The rotation speed of the motor 6 is inputted from the rotation speed detector 18 into the speed comparator 12.

The PID adjuster 13 calculates a torque required in the motor 6 to set the rotation speed of the motor 6 to the target value, based on the error speed by means of PID calculation.

The drive-voltage duty-ratio calculator 14 calculates a drive voltage of the motor 6 in the synchronous rectification type, based on the torque calculated by the PID adjuster 13, the rotation speed of the motor 6, and the electrical specification of the motor 6. Moreover, the drive-voltage duty-ratio calculator 14 sets a duty ratio of a PWM signal in the synchronous rectification type, based on the calculated drive voltage. Furthermore, the drive-voltage duty-ratio calculator 14 calculates a PWM setting value corresponding to the calculated drive voltage and outputs the PWM setting value to a comparator 19 of the simple PWM generator 16.

The carrier signal generator 15 generates a saw-tooth wave or triangle wave carrier signal of a predetermined cycle and outputs the carrier signal to the simple PWM generator 16.

The simple PWM generator 16 generates a rectangle wave PWM signal and outputs the PWM signal to the driver 3. The simple PWM generator 16 has the comparator 19. The comparator 19 generates a PWM signal with the set duty ratio by comparing the carrier signal and the PWM setting value. The comparator 19 outputs the PWM signal with the set duty ratio to a switch element SW1 of the driver 3 to be described later, and outputs a PWM signal with the opposite phase to the PWM signal outputted to the switch element SW1, to a switch element SW2.

The capture unit 17 obtains a pulse signal outputted from the speed detector 5 and corresponding to the rotation angle of the motor 6, and measures the cycle of the pulse signal.

The rotation speed detector 18 calculates the rotation speed of the motor 6 based on the cycle of the pulse signal measured by the capture unit 17. The rotation speed detector 18 outputs the calculated rotation speed to the speed comparator 12.

The driver 3 drives the motor 6 by using a PWM signal inputted from the embedded microcomputer 2. The driver 3 includes a predriver 21 and an H-bridge circuit 22.

The predriver 21 connects the comparator 19 of the simple PWM generator 16 to the switch elements SW1, SW2 of the H-bridge circuit 22. The PWM signals outputted from the comparator 19 and having phases opposite to each other are inputted respectively into the switch elements SW1, SW2 via the predriver 21.

The H-bridge circuit 22 includes four switch elements SW1 to SW4. The switch elements SW1, SW2 are connected in series between a power supply voltage terminal P and a ground terminal in a line connected to one terminal of the motor 6. Meanwhile, the switch elements SW3, SW4 are connected in series between the power supply voltage terminal P and the ground terminal in a line connected to another terminal of the motor 6. In the H bridge circuit 22, the switch elements SW1, SW4 located on a diagonal form one pair and the switch elements SW2, SW3 located on a diagonal form another pair. For example, in an H (high) period of the PWM signal inputted into the switch element SW1, the switch elements SW1, SW4 are set to an on state. In this case, the PWM signal inputted in the switch element SW2 is in an L (low) period, and the switch elements SW2, SW3 are set to an off state.

The power supply 4 supplies voltage to the driver 3. The power supply 4 is connected to the power supply voltage terminal P of the H-bridge circuit 22.

The speed detector 5 outputs the pulse signal corresponding to the rotation angle of the motor 6. The speed detector 5 is formed of, for example, a rotary encoder.

In control performed by the aforementioned drive control device 1, the PID adjuster 13, the drive-voltage duty-ratio calculator 14, the carrier signal generator 15, the simple PWM generator 16, and the driver 3 form, a control element. A control target is an electrical system including the motor 6 and an entire mechanical system. The controlled variable is the rotation speed of the motor 6. The speed detector 5, the capture unit 17, and the rotation speed detector 18 form a feedback element (negative feedback loop of the rotation speed of the motor).

Next, the control target in the control of the drive control device 1 is described.

First, the control target in the mechanical system is described.

Figure 2:
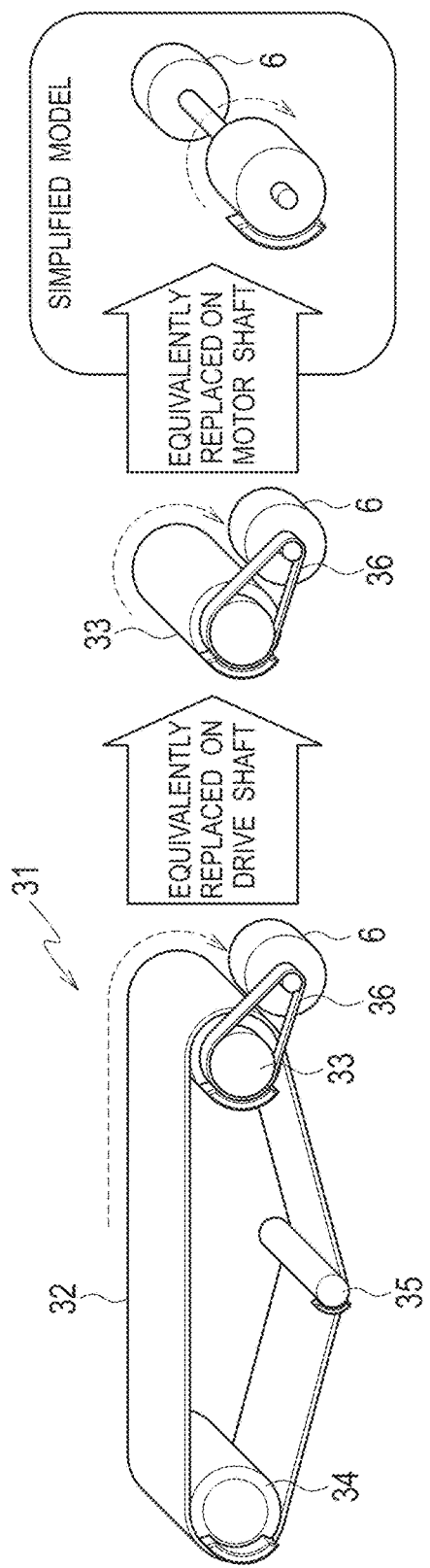
FIG. 2 is a diagram illustrating an example of a control target in a mechanical system.

The control target in the mechanical system includes, for example, a sheet conveyer 31 provided in a printing device as illustrated in FIG. 2. The sheet conveyer 31 has a conveyer belt 32. The conveyer belt 32 is an annular belt wound around a drive roller 33 and driven rollers 34, 35. The drive roller 33 is rotationally driven by the motor 6. The driven rollers 34, 35 follow the conveyer belt 32. A drive belt 36 transmits drive force of the motor 6 to the drive roller 33. Drive of the motor 6 causes the drive roller 33 to rotate and rotation of the conveyer belt 32 transfers a sheet placed on the conveyer belt 32.

As illustrated in FIG. 2, the mechanical system can be expressed by a simplified model in which the conveyer belt 32 and the like of the sheet conveyer 31 is equivalently replaced on a motor shaft.

Figure 3:
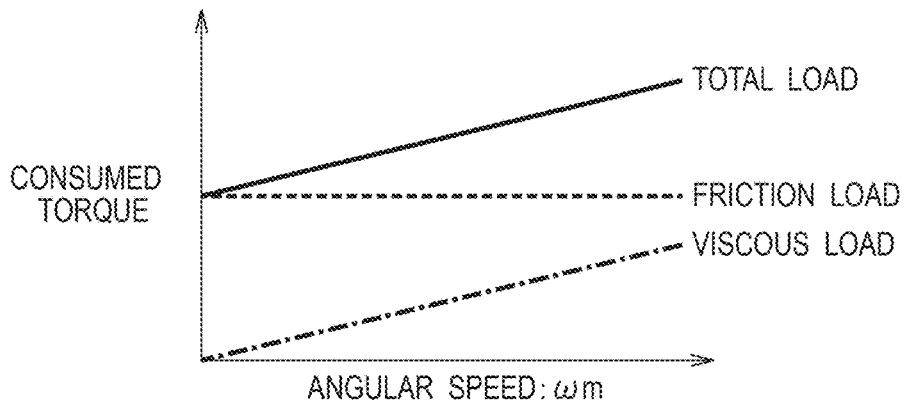
FIG. 3 is a diagram illustrating a load characteristic of the mechanical system.

Note that, as illustrated in FIG. 3, a load of the mechanical system (total load) is the sum of a friction load and a viscous load. An equation of motion (Newton's second law) of the simplified model of the mechanical system having such a load characteristic is expressed by the following formula (1)

$$Tm(t)=Jm\cdot d\omega m(t)/dt+Wq\cdot \omega m(t)+To \quad (1)$$

ωm [rad/sec]: angular speed
Tm [N·m]: supplied torque
Jm [Kg·m$^2$]: moment of inertia
Wq [N·m/(rad/sec)] viscous load resistance
To [N·m]: friction load torque.

When the formula (1) is Laplace-transformed into an S function expression, the following formula (2) is obtained.

$$Tm(s)=Jm\cdot S\cdot \omega m(s)+Wq\cdot \omega m(s)+To \quad (2).$$

Accordingly, an angular speed (rotation speed) ωm(s) can be obtained from the following formula (3).

$$\omega m(s)=(Tm(s)-To)/(Jm\cdot S+Wq) \quad (3).$$

Figure 4:
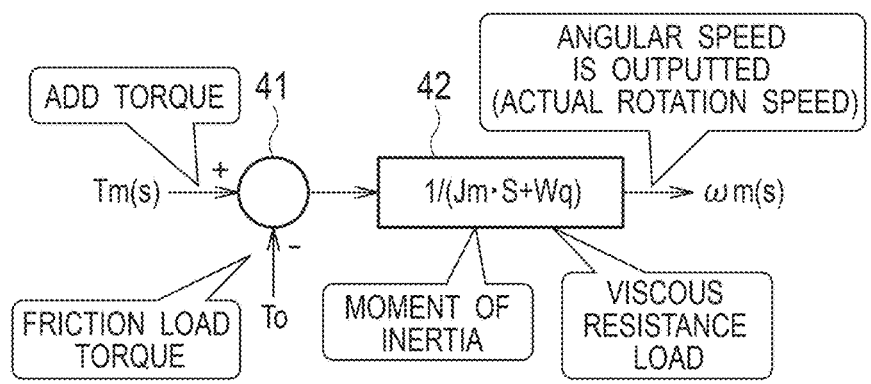
FIG. 4 is a block line diagram of the control target in the mechanical system.

FIG. 4 illustrates an expression of the control target in the mechanical system in a block line diagram. In FIG. 4, a summing point 41 outputs a value (Tm(s)−To) obtained by subtracting the friction load torque To from the torque Tm(s). A block 42 outputs the angular speed (rotation speed) ωm(s) expressed by the formula (3) by multiplying (Tm(s)−To) inputted from, the summing point 41 by 1/(Jm·S+Wq).

Next, the control target in the electrical system is described.

Figure 5:
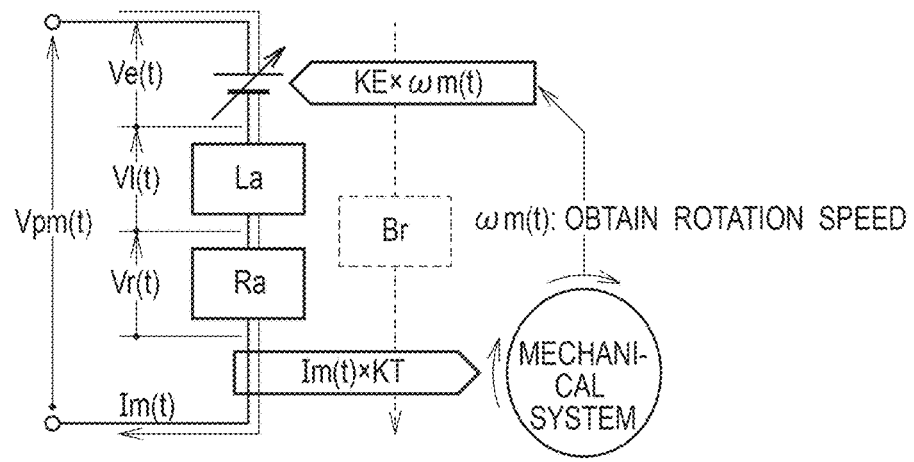
FIG. 5 is an equivalent circuit diagram of a motor.

The control target in the electrical system is the motor 6. The motor 6 which is a DC motor can be expressed by an equivalent circuit as illustrated in FIG. 5. In this description, contents of parameters are as described below.

Vpm [V]: inter-terminal voltage (PWM voltage supplied to the motor)
Ve [V]: reverse induced voltage (voltage generated by rotation of the motor itself)
KE [V/(rad/sec)]: induced voltage constant (constant for converting the rotation speed to the induced voltage)
La [H]: armature winding inductance
Ra [Ω]: armature winding resistance
Im [A]: armature winding current
Kt [N·m/A]: torque constant (constant for converting a current to torque)
Tm [N·m]: generated torque
ωm [rad/sec]: angular speed.

In the equivalent circuit illustrated in FIG. 5, expression formulae of the motor 6 are as illustrated in the following formulae (4) to (6).

$$Vpm(t)=La\cdot dIm(t)/dt+Ra\cdot Im(t)+Ve(t) \quad (4)$$

$$Ve(t)=KE\cdot \omega m(t) \quad (5)$$

$$Tm(t)=KT\cdot Im(t) \quad (6).$$

The following formulae (7) to (9) are obtained by Laplace-transforming the formulae (4) to (6) into S-function expression.

$$Vpm(s)=La\cdot S\cdot Im(s)+Ra\cdot Im(s)+Ve(s) \quad (7)$$

$$Ve(s)=KE\cdot \omega m(s) \quad (8)$$

$$\omega m(s)=KT\cdot Im(s) \quad (9).$$

From the formulae (7) and (8), the armature winding current Im(s) is expressed by the following formula (10).

$$Im(s)=(Vpm(s)-KE\cdot \omega m(s))/La\cdot S+Ra) \quad (10).$$

Figure 6:
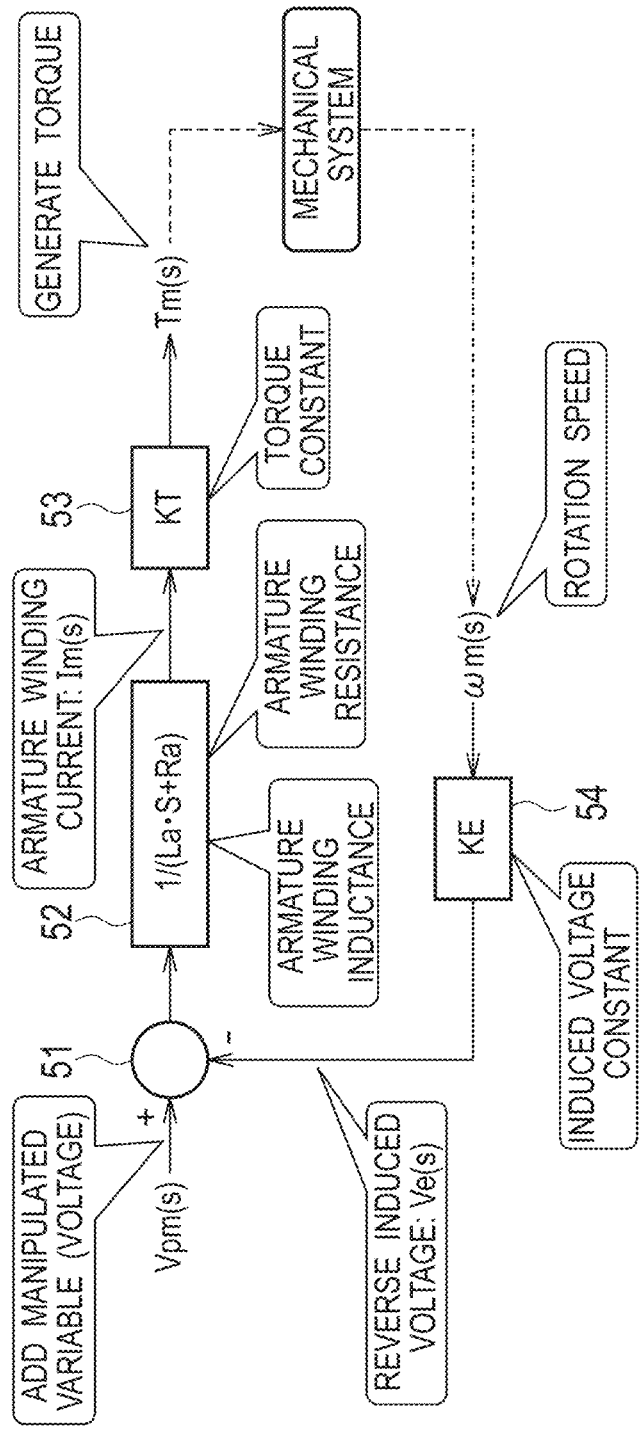
FIG. 6 is a block line diagram of the motor.

FIG. 6 illustrates an expression of the equivalent circuit illustrated in FIG. 5 in a block line diagram. In FIG. 6, a summing point 51 outputs a value (Vpm(s)−Ve) obtained by subtracting the reverse induced voltage Ve from the inter-terminal voltage Vpm(s). A block 52 multiples (Vpm(s)−Ve) inputted, from, the summing point 51 by 1/(La·S+Ra) and outputs the armature winding current Im(s) expressed, by the formula (10). A block 53 multiplies the armature winding current Im(s) by the torque constant KT and outputs the torque Tm(s) expressed by the formula (9). The torque Tm(s) acts on the mechanical system and the angular speed (rotation speed) ωm(s) is obtained. A block 54 multiples the angular speed ωm(s) by the induced voltage constant KE and outputs the reverse induced voltage Ve(S) expressed by the formula (8) to the summing point 51.

Figure 7:
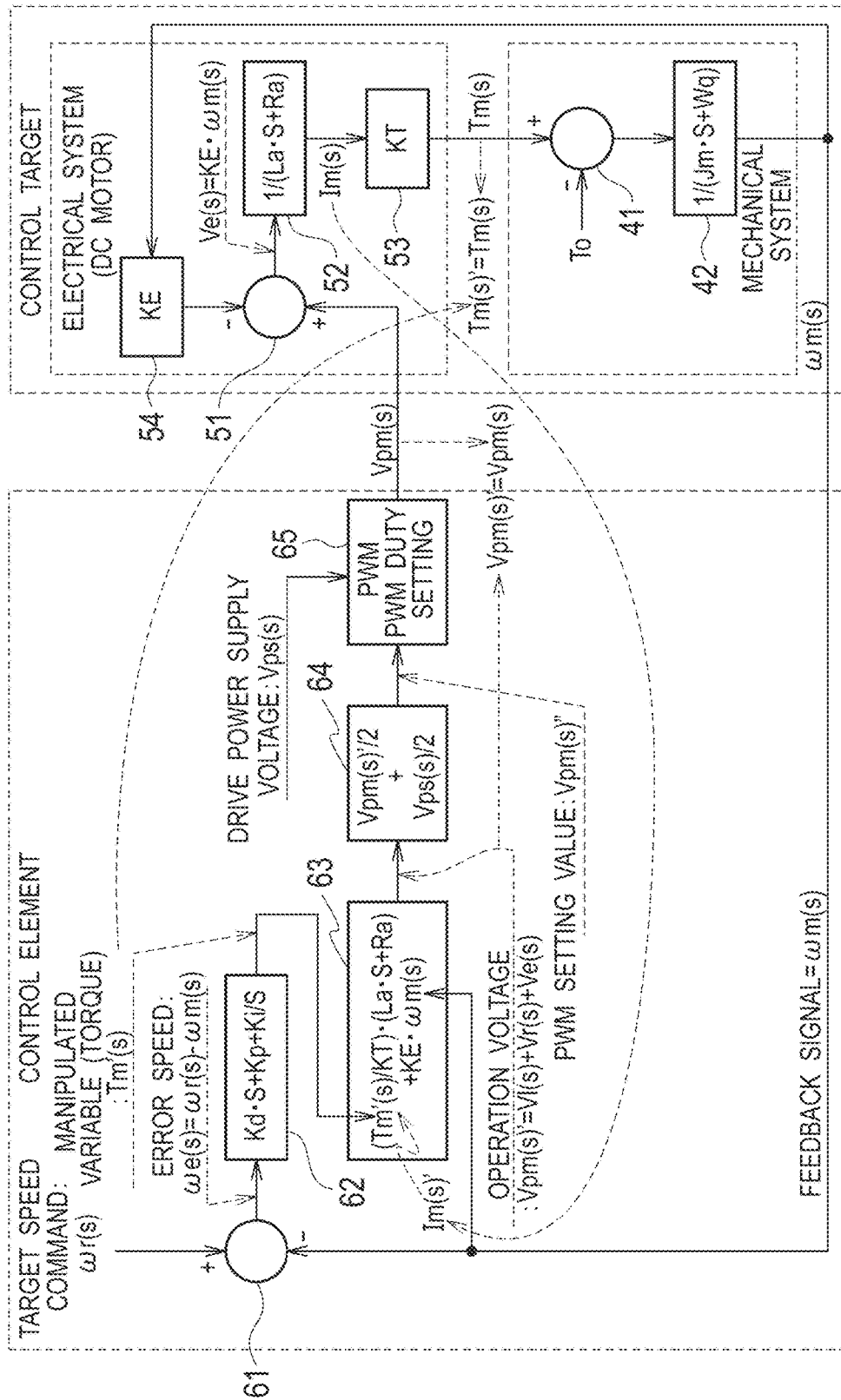
FIG. 7 is a block line diagram of a drive control device in the embodiment.

Next, an operation of the rotation speed control in the drive control device 1 is described by using the block line diagram of FIG. 7. Note that portions of the control targets in the mechanical system and the electrical system, in the block line diagram of FIG. 7 are the same as those in the block line diagrams illustrated in FIGS. 4 and 6.

In FIG. 7, a summing point 61 subtracts the angular speed (rotation speed) ωm(s) of the motor 6 from a target value ωr(s) of the rotation speed of the motor 6 and outputs the error speed ωe(s). The calculation of the summing point 61 corresponds to processing by the speed comparator 12 in FIG. 1. The target value ωr(s) is outputted to speed comparator 12 by the speed setter 11. The angular speed ωm(s) is calculated by the rotation speed detector 18 according to the output pulse signal of the speed detector 5.

A block 62 performs appropriate gain adjustment for each PID element based on the equation of motion in the aforementioned formula (1) for the error speed ωm(s) inputted from the summing point 61, and calculates a torque Tm'(s) required to set the rotation speed of the motor 6 to the target value ωr(s). In this case, Kd is a differential (acceleration) gain. Kp is a proportional (speed) gain. Ki is an integral (displacement) gain. The calculation of the block 62 corresponds to processing by the PID adjuster 13 in FIG. 1.

A block 63 calculates a drive voltage Vpm(s)' of the motor 6 in the synchronous rectification type, based on the torque Tm'(s) inputted from the block 62, the angular speed ωm(s) of the motor 6, and the electrical specification (electrical parameter) of the motor 6. The armature winding inductance La, the armature winding resistance Ra, the torque constant KT, and the induced voltage constant KE are used as the electrical parameters of the motor 6. The drive voltage Vpm(s)' is calculated by using the following formula (11).

$$Vpm(s)' = V1(s) + Vr(s) + Ve(s) \quad (11)$$
$$= (Tm'(s)/KT) \cdot (La \cdot S + Ra) + KE \cdot \omega m(s)$$

The current Im(s)' to flow through the motor 6 is calculated by using the following formula (12).

$$Im(s)' = Tm'(s)/KT \quad (12)$$

The calculation of the block 63 corresponds to part of the processing by the drive-voltage duty-ratio calculator 14 of FIG. 1. The angular speed ωm(s) of the motor 6 is inputted from the rotating speed detector 18 into the drive-voltage duty-ratio calculator 14 to be used for the calculation of the reverse induced voltage Ve(s) in the calculation of the drive voltage Vpm(s)'.

A block 64 calculates a PWM setting value Vpm(s)" corresponding to the drive voltage Vpm(s)' inputted from the block 63. The PWM setting value Vpm(s)" is used to generate the PWM signal with the simple PWM generator 16 of FIG. 1. The PWM setting value Vpm(s)" is calculated by the following formula (13).

$$Vpm(s)'' = Vpm(s)'/2 + Vps(s)/2 \quad (13)$$

In this formula, Vps is a drive power supply voltage of the power supply 4 of FIG. 1. The calculation of the block 64 corresponds to part of the processing by the drive-voltage duty-ratio calculator 14 of FIG. 1.

In a block 65, the duty ratio of the PWM signal corresponding to the drive voltage Vpm(s)' is set and the motor 6 is driven by using the PWM signal with the set duty ratio. The duty ratio of the PWM signal (PWM_Duty) is calculated from the following formula (14).

$$PWM\_Duty\ [\%] = (Vpm(s)' + Vps(s)) \cdot 100/2 \cdot Vps(s) \quad (14)$$

It is known that, in the synchronous rectification type, the average value of the drive voltage of the motor and the duty ratio of the PWM signal are proportional to each other. Moreover, when the duty ratio is 50%, the average value of the drive voltage is zero and the motor is in a stop state. When the duty ratio is greater than 50%, the average value of the drive voltage is a positive value. When the duty ratio is less than 50%, the average value of the drive voltage is a negative value. The motor can be thereby rotated, in a forward direction and a reverse direction.

The drive voltage Vpm(s)' calculated by using the formula (11) is a value between −Vps(s) and +Vps(s). When Vpm(s)'=Vps(s), the duty ratio is 100%. When Vpm(s)'=−Vps(s), the duty ratio is 0%. When Vpm(s)'=0, the duty ratio is 50%. Moreover, from the aforementioned characteristic of the synchronous rectification type, the drive voltage Vpm(s)' and the duty ratio are proportional. Based on this fact, the duty ratio of the PWM signal corresponding to the drive voltage Vpm(s)' is calculated from the formula (14).

The processing of the block 65 corresponds to the processing of part of the drive-voltage duty-ratio calculator 14, the carrier signal generator 15, the simple PWM generator 16, and the driver 3 of FIG. 1.

The inter-terminal voltage Vpm(s) of the motor 6 is controlled by the aforementioned control to be set equal to the drive voltage Vpm(s)' which is calculated by the block 63 and which is used to set the rotation speed of the motor 6 to the target value ωr(s). The torque Tm(s) generated in the motor 6 by the drive at the drive voltage Vpm(s)' becomes equal to the torque Tm'(s) calculated in the block 62. Moreover, the current (armature winding current) Im(s) flowing in the motor 6 becomes equal to the current Im(s)' calculated from Tm'(s).

Figure 8:
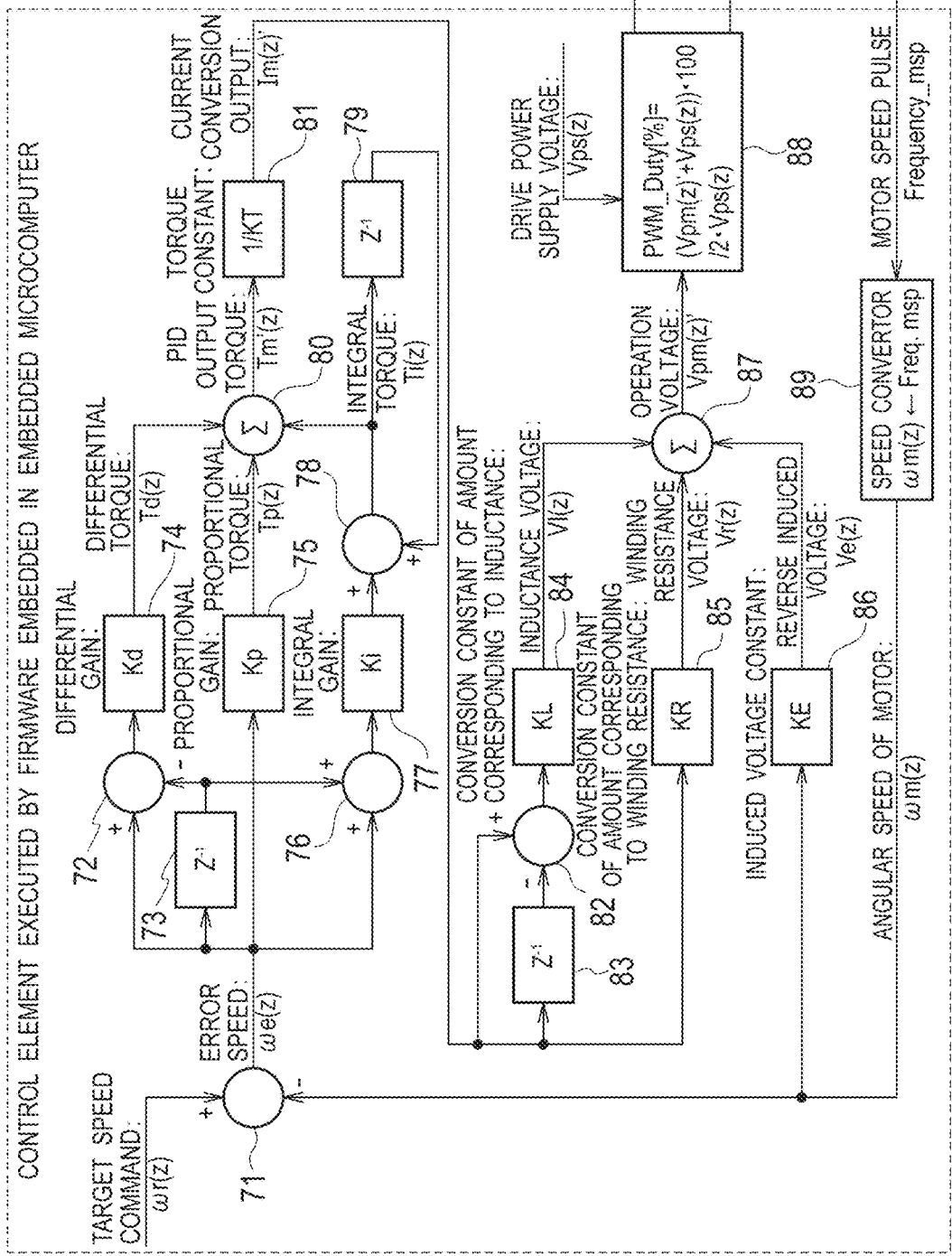
FIG. 8 is a schematization of an Algol of rotation speed control in the drive control device in the embodiment.

Next, an Algol (Algorithmic Language) of the rotation speed control in the drive control device 1 is described by using FIG. 8. FIG. 8 is schematization of the Algol (expression obtained by performing Z conversion on an S function) of the rotation speed control. This Algol is executed by firmware embedded in the embedded microcomputer 2.

In FIG. 8, a subtractor 71 subtracts an angular speed (rotation speed) ωm(z) of the motor 6 from a target value ωr(z) of the rotation speed of the motor 6 and outputs an error speed ωe(z). The subtractor 71 corresponds to the speed comparator 12 of FIG. 1.

A subtractor 72 subtracts an error speed, ωe(z) subjected to unit delay in a delayer 73 from the error speed ωe(z) inputted from the subtractor 71.

A differential calculator 74 calculates a differential torque Td(z) by multiplying the calculation result of the subtractor 72 by the differential gain Kd.

A proportion calculator 75 calculates a proportional torque Tp(z) by multiplying the error speed ωe(z) inputted from the subtractor 71 by the proportional gain Kp.

An adder 76 adds the error speed ωe(z) subjected to unit delay in the delayer 73 to the error speed ωe(z) inputted from the subtractor 71.

An integral calculator 77 multiplies the calculation result of the adder 76 by the integral gain Ki. An adder 78 adds an integral torque Ti(z) subjected to unit delay in a delayer 79 to the calculation result of the integral calculator 77 and calculates the integral torque Ti(z).

An adder 80 adds up the differential torque Td(z), the proportional torque Tp(z), the integral torque Ti(z) to calculate a PTD output torque Tm'(z). The PID output torque Tm'(z) is a torque required, to set the rotation speed of the motor 6 to the target value ωm(z).

The processing by the subtractor 72, the delayer 73, the differential calculator 74, the proportion, calculator 75, the adder 76, the integral calculator 77, the adder 78, the delayer 79, and the adder 80 corresponds to processing by the PID adjuster 13 of FIG. 1.

A current converter 81 converts the PID output torque Tm'(z) to a current Im(z)' to flow in the motor 6 by dividing the PID output torque Tm'(z) by a torque constant KT.

A subtractor 82 subtracts the current Im(z)' subjected to unit delay in a delayer 83 from the current Im(z)' inputted from the current converter 81.

An inductance voltage calculator 84 calculates an inductance voltage Vl(z) by multiplying the calculation result of the subtractor 82 by a conversion constant KL of an amount corresponding to inductance.

A winding resistance voltage calculator 85 calculates a winding resistance voltage Vr(z) by multiplying the current Im(z)' inputted from the current converter 81 by a conversion constant KR of an amount corresponding to a winding resistance.

A reverse induced voltage calculator 86 calculates a reverse induced voltage Ve(z) by multiplying the angular speed ωm(s) of the motor 6 by a induced voltage constant KE.

An adder 87 calculates a drive voltage Vpm(z)' of the motor 6 in the synchronous rectification type by adding up the inductance voltage Vl(z), the winding resistance voltage Vr(z), and the reverse induced voltage Ve(z).

A duty ratio calculator 88 calculates the duty ratio (PWM_Duty) of the PWM signal by using the aforementioned formula (14). The motor 6 is driven by using the PWM signal with, the calculated duty ratio.

The processing by the current converter 81, the subtractor 82, the delayer 83, the inductance voltage calculator 84, the winding resistance voltage calculator 85, the reverse induced voltage calculator 86, the adder 87, and the duty ratio calculator 88 corresponds to the processing by the drive-voltage duty-ratio calculator 14 of FIG. 1.

A speed converter 89 converts the pulse signal (motor speed pulse) outputted from the speed detector 5 to the angular speed ωm(z) of the motor 6. The angular speed ωm(z) is outputted to the subtractor 71 and the reverse induced voltage calculator 86, The processing by the speed converter 89 corresponds to the processing by the capture unit 17 and the rotation speed detector 18 of FIG. 1.

Next, an operation of generating the PWM signal in the simple PWM generator 16 is described.

Figure 9:
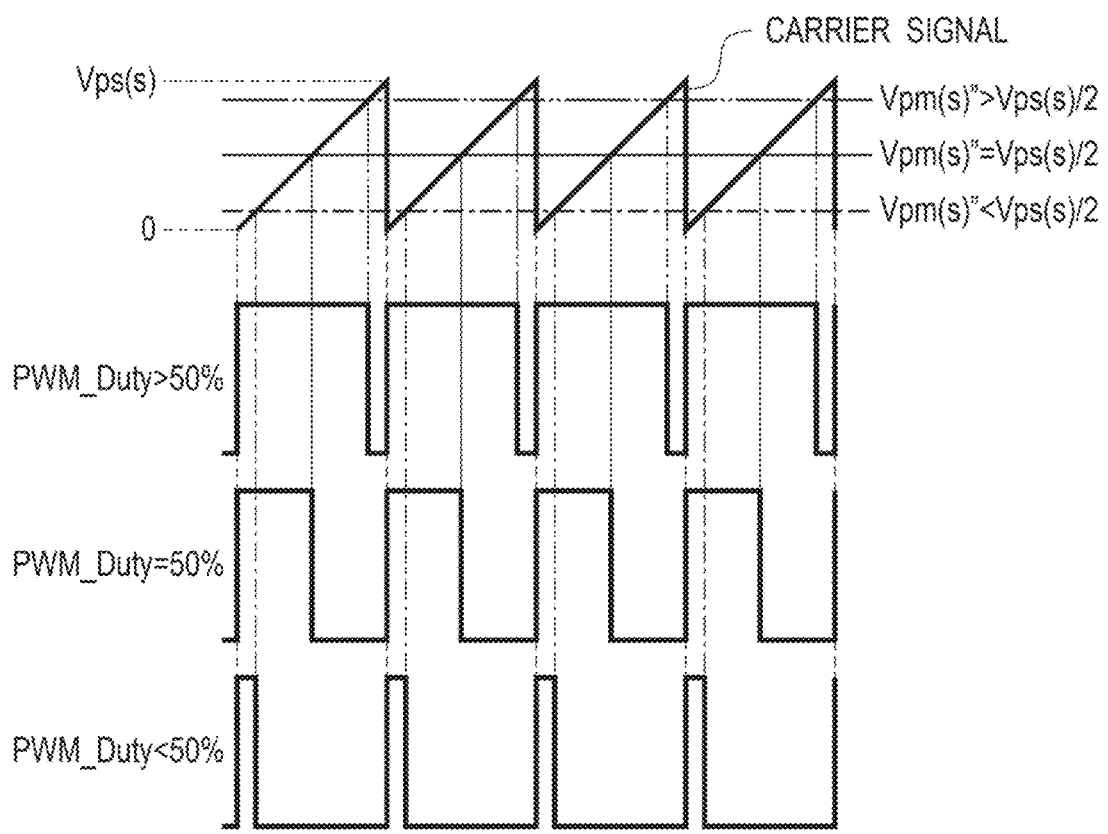
FIG. 9 is a diagram explaining an operation of generating a PWM signal in a simple PWM generator.

The carrier signal inputted from the carrier signal generator 15 into the comparator 19 of the simple PWM generator 16 takes a value between zero and Vps(s) as depicted in FIG. 9.

The PWM setting value Vpm(s)" calculated by using the aforementioned formula (13) also takes a value between zero and Vps(s). When the drive voltage Vpm(s)' of the motor 6 is equal to zero, Vpm(s)"=Vps(s)/2. When Vpm(s)'>0, Vpm(s)">Vps(s)/2. When Vpm(s)'<0, Vpm(s)"<Vps(s)/2.

The comparator 19 compares the carrier signal and the PWM setting value Vpm(s)" and generates a PWM signal which is at a high level in a period when the value of the PWM setting value Vpm(s)" is greater than the value of the carrier signal and which is at a low level in a period when the value of the PWM setting value Vpm(s)" is less than the value of the carrier signal.

A PWM signal whose duty ratio is greater than 50% is thereby generated when Vpm(s)">Vps(s)/2, i.e. when Vpm(s)'>0 as depicted in FIG. 9. Moreover, a PWM signal whose duty ratio is 50% is generated when Vpm(s)"=Vps(s)/2, i.e. when Vpm(s)'=0. A PWM signal whose duty ratio is less than 50% is generated when Vpm(s)"<Vps(s)/2, i.e. when Vpm(s)'<0.

Since the simple PWM generator 16 generates the PWM signal by simply comparing the carrier signal and the PWM setting value Vpm(s)", the PWM signal can be generated in a short time. This achieves performances including highly-accurate rotation speed control of the motor 6 and high-speed response to the target speed command.

The PWM signal generated by the simple PWM generator 16 is inputted in to the driver 3 and the motor 6 is driven according to the duty ratio of the PWM signal.

Figure 10:
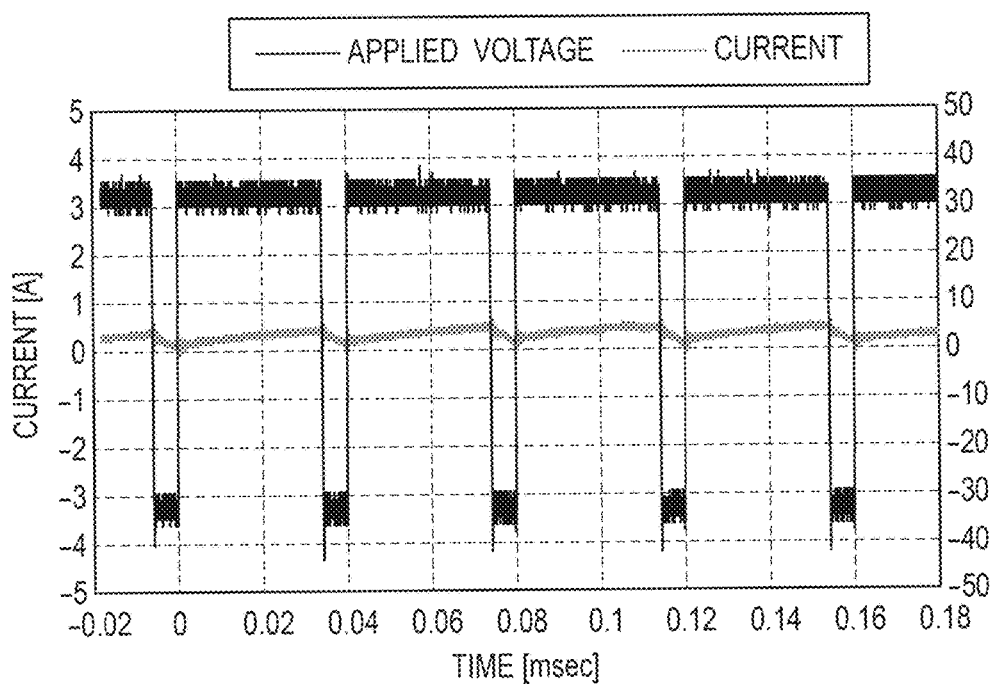
FIG. 10 is a graph depicting an example of waveforms of an inter-terminal voltage of the motor subjected to drive control using the PWM signal and a current flowing in the motor.
Figure 11:
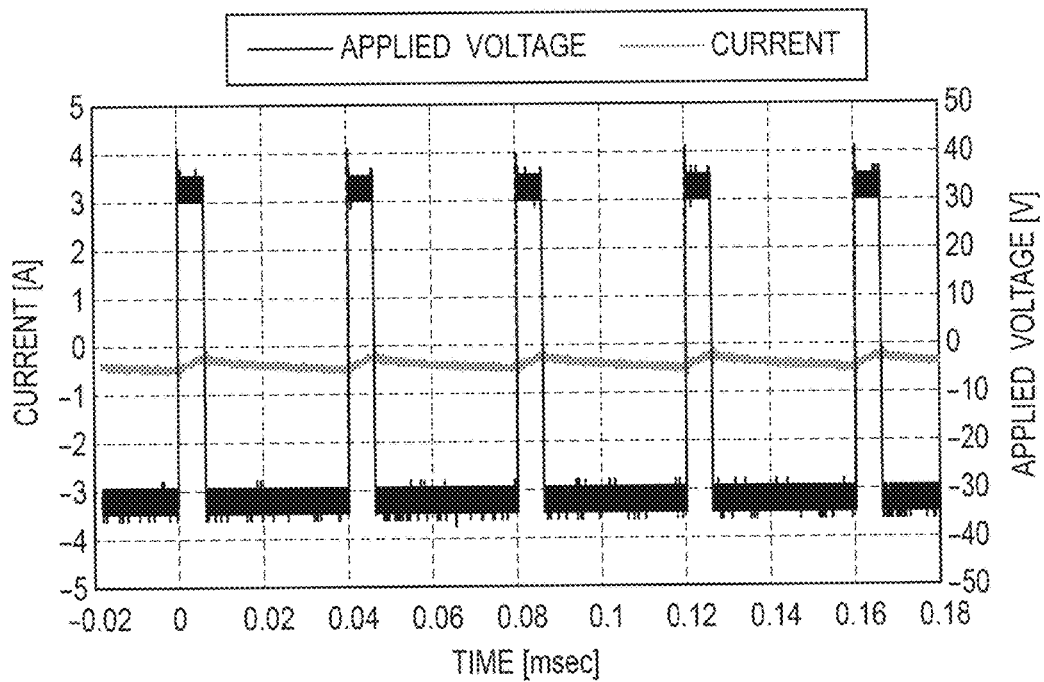
FIG. 11 is a graph depicting another example of the waveforms of the inter-terminal voltage of the motor subjected to drive control using the PWM signal and the current flowing in the motor.

FIGS. 10 and 11 depict examples of waveforms of voltage applied to the motor 6 subjected to drive control using the PWM signal and the current Im flowing in the motor 6, FIG. 10 depicts an example of the waveforms of the voltage and the current Im applied to the motor 6 in the case where the duty ratio of the PWM signal is 90%. In this case, a positive current Im flows in the motor 6 and the motor 6 rotates in the forward direction. FIG. 11 depicts an example of the waveforms of the voltage and the current Im applied to the motor 6 in the case where the duty ratio of the PWM signal is 10%. In this case, a negative current Im flows in the motor 6 and the motor 6 rotates in the reverse direction.

Next, description is given of comparison between the rotation speed control of the motor 6 by the drive control device 1 and rotation speed control ignoring the inductance component of the motor 6.

In the rotation speed control ignoring the inductance component of the motor 6, the drive voltage Vpm(s)' is calculated by using the aforementioned formula (11), assuming that Vl(s)=0.

Figure 12:
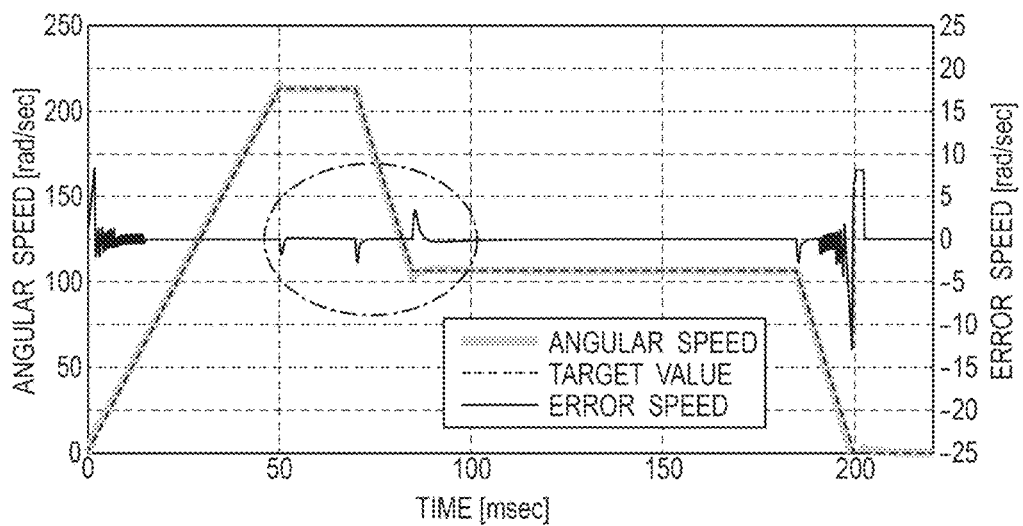
FIG. 12 is a graph depicting changes in an angular speed of the motor and an error speed in a simulation in which the drive control device in the embodiment performs rotation speed control on the motor.
Figure 13:
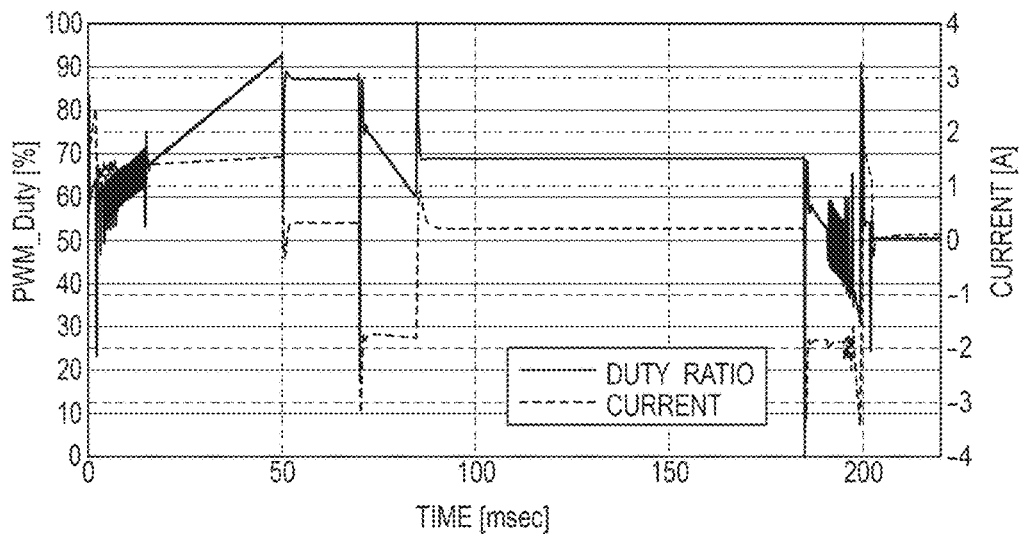
FIG. 13 is a graph depicting changes in a duty ratio of the PWM signal and the current flowing in the motor in the simulation in which the drive control device in the embodiment performs rotation speed control on the motor.
Figure 14:
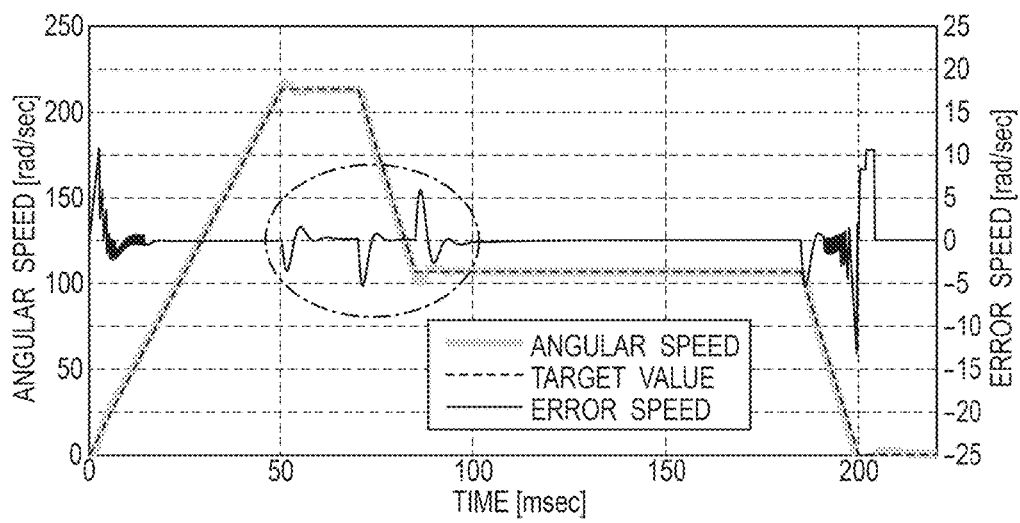
FIG. 14 is a graph depicting changes in the angular speed of the motor and the error speed in a simulation of rotation speed control according to a comparative example.
Figure 15:
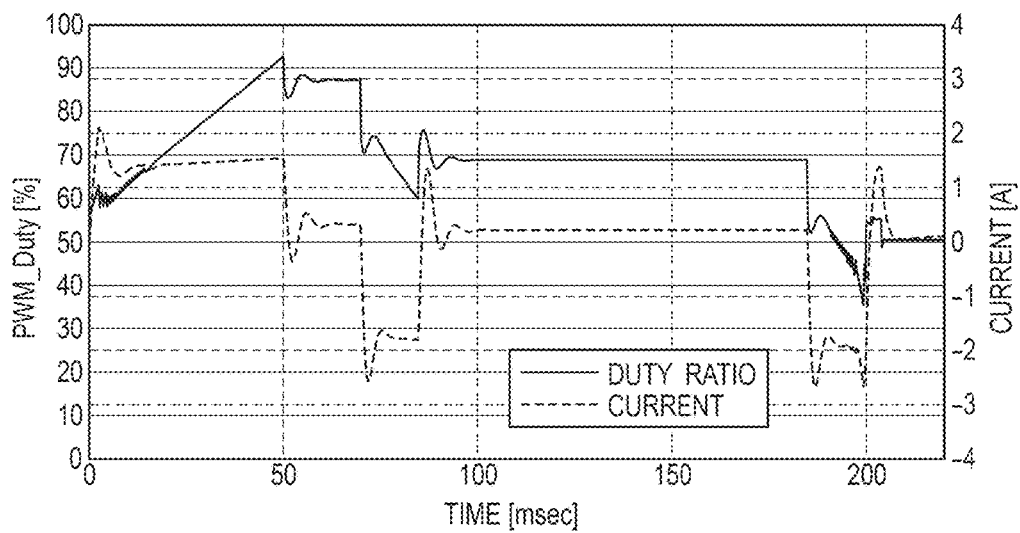
FIG. 15 is a graph depicting changes in the duty ratio of the PWM signal and the current flowing in the simulation of the rotation speed control according to the comparative example.

FIGS. 12 and 13 are graphs depicting simulation results of the rotation speed control of the motor 6 by the drive control device 1. FIGS. 14 and 15 are graphs depicting simulation results of the rotation speed control of a comparative example in which the inductance component of the motor 6 is ignored. FIGS. 12 and 14 depict changes in the angular speed ωm of the motor 6 and the error speed ωe. FIGS. 13 and 15 depict changes in the duty ratio of the PWM signal and the current Im flowing in the motor 6.

In FIG. 12, the error speed ωe at a speed change point appearing in a portion surrounded by a one-dot chain line of FIG. 12 is smaller than the error speed at a speed change point appearing in a portion surrounded by a one-dot chain line of FIG. 14. Moreover, in FIG. 13, the changes in the duty ratio of the PWM signal and the current Im flowing in the motor 6 are sharper than those in FIG. 15.

As described above, in the drive control device 1, decrease in the response performance due to integral delay of the current to the voltage caused by the inductance can be suppressed by considering the inductance component.

Next, evidence data on a performance of the drive control device 1 regarding the rotation speed control of the motor 6 is depicted in FIGS. 16 to 23.

Figure 16:
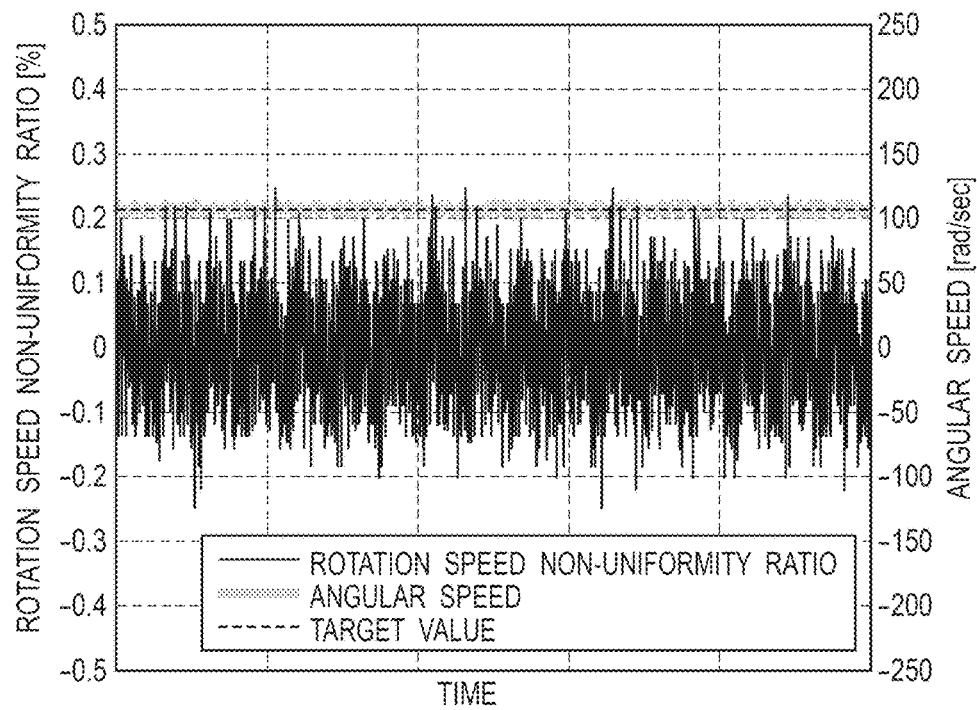
FIG. 16 is a graph depicting an example of measured data of a rotation speed non-uniformity ratio in forward rotation.
Figure 17:
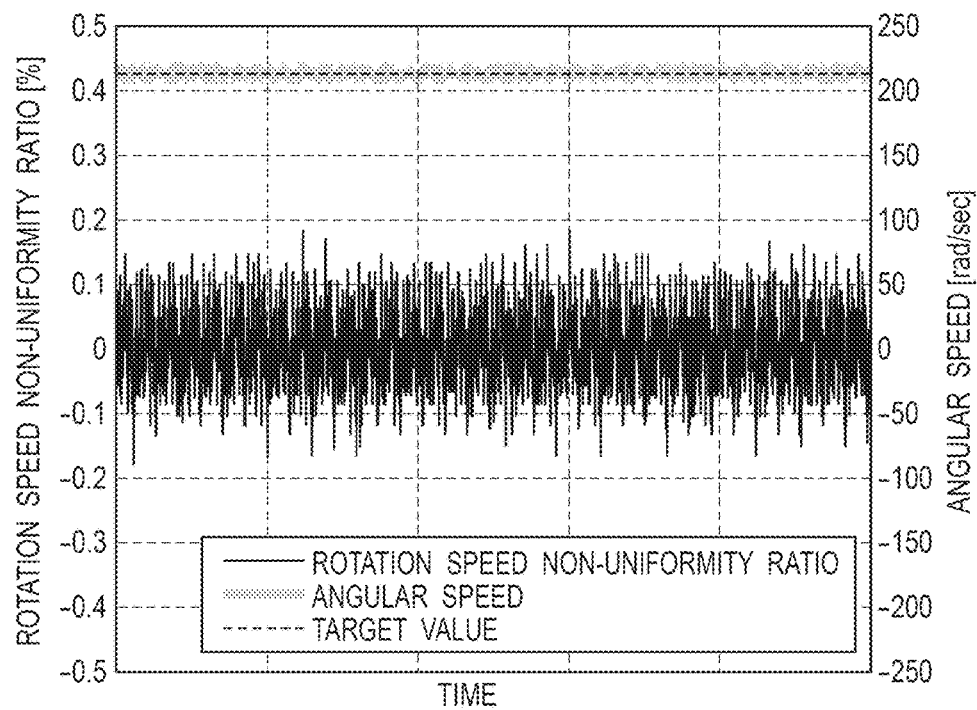
FIG. 17 is a graph depicting another example of the measured data of the rotation speed non-uniformity ratio in the forward rotation.
Figure 18:
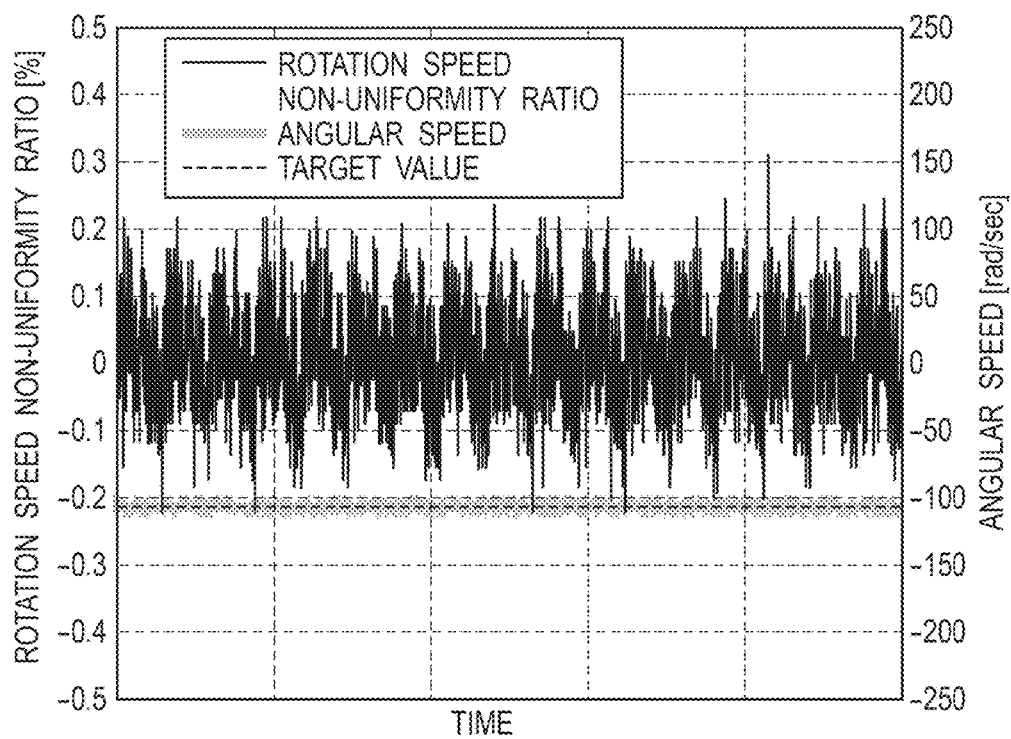
FIG. 18 is a graph depicting an example of the measured data of the rotation speed non-uniformity ratio in reverse rotation.
Figure 19:
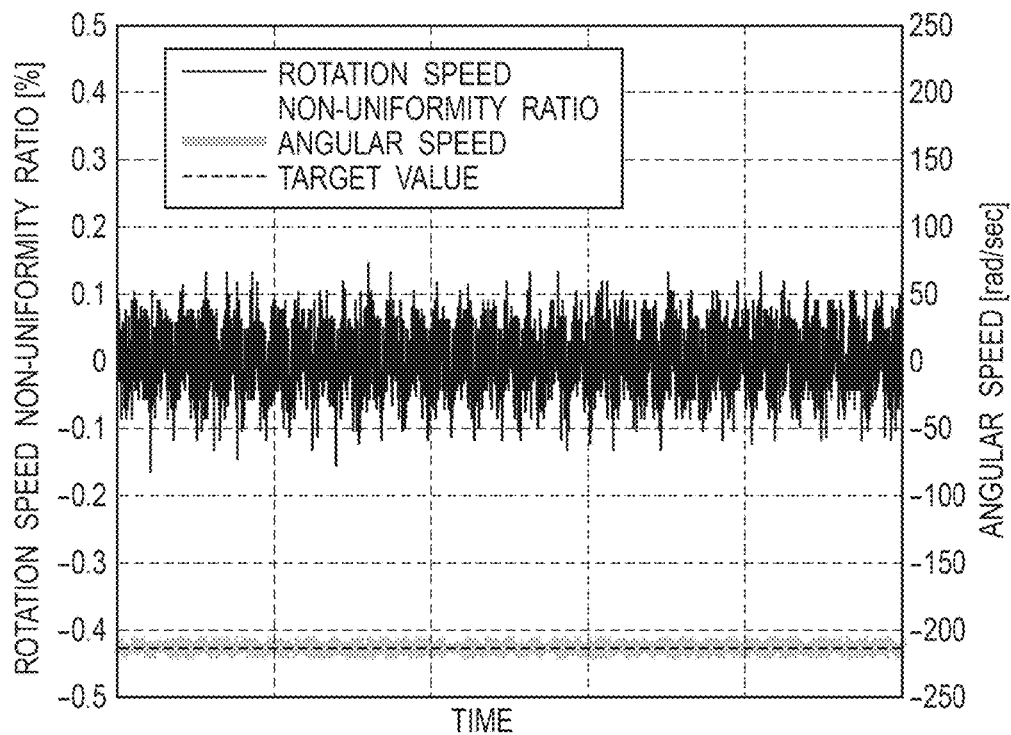
FIG. 19 is a graph depicting another example of the measured data of the rotation speed non-uniformity ratio in the reverse rotation.

FIGS. 16 and 17 are measured data of rotation speed non-uniformity ratios Wow in rotation in the forward direction. FIGS. 16 and 17 are measured data of the rotation speed non-uniformity ratios Wow with respect to the target values ωr different from each other, respectively. FIGS. 18 and 19 are measured data of the rotation speed non-uniformity ratios Wow in rotation in the reverse direction. FIGS. 18 and 19 are measured data of the rotation speed non-uniformity ratios Wow with respect to the target values ωr different from each other, respectively. FIGS. 20 to 23 are views depicting results obtained by performing FFT analysis on the rotation speed non-uniformity ratios Wow of FIGS. 16 to 19, respectively.

In this case, each of the rotation speed non-uniformity ratios Wow [%] is expressed by the following formula (15).

$$Wow=(\omega m-\omega r)-100/\omega r \quad (15)$$

Figure 20:
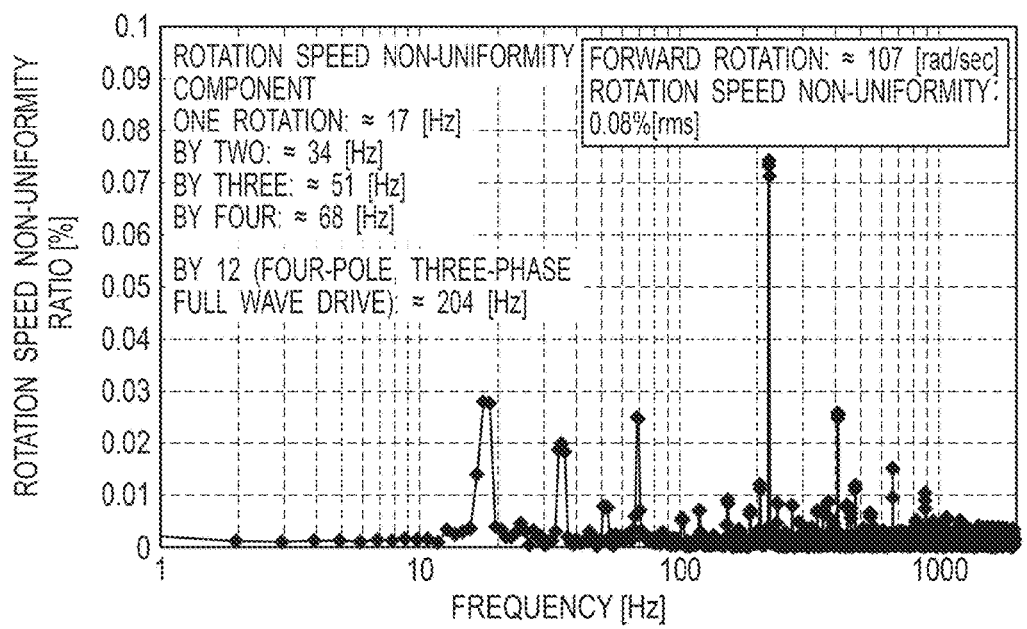
FIG. 20 is a graph illustrating a result obtained by performing FFT analysis on the rotation speed non-uniformity ratio of FIG. 16.
Figure 21:
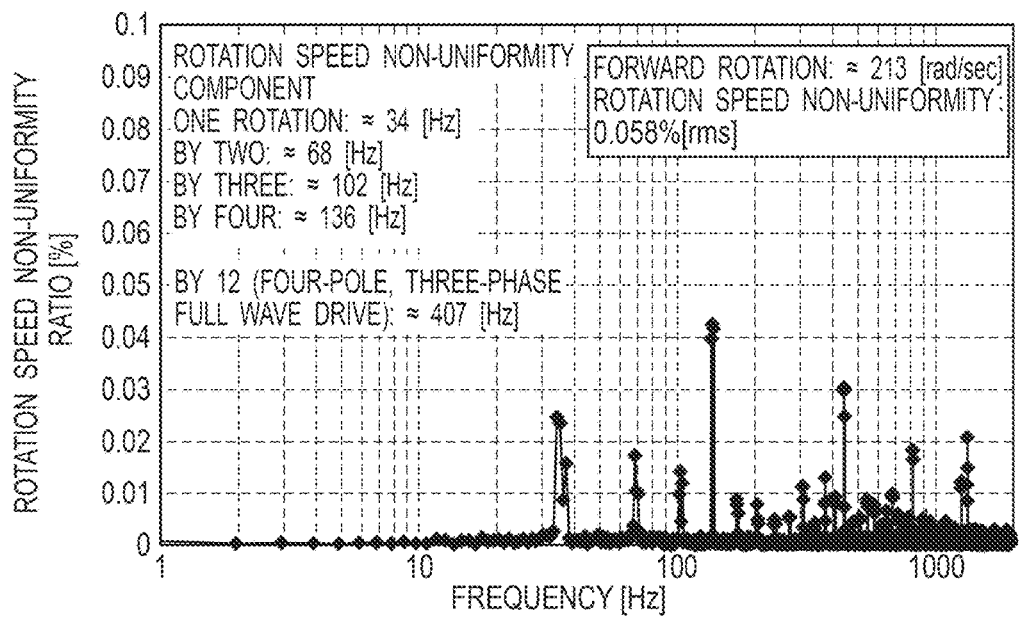
FIG. 21 is a graph illustrating a result obtained by performing the FFT analysis on the rotation speed non-uniformity ratio of FIG. 17.
Figure 22:
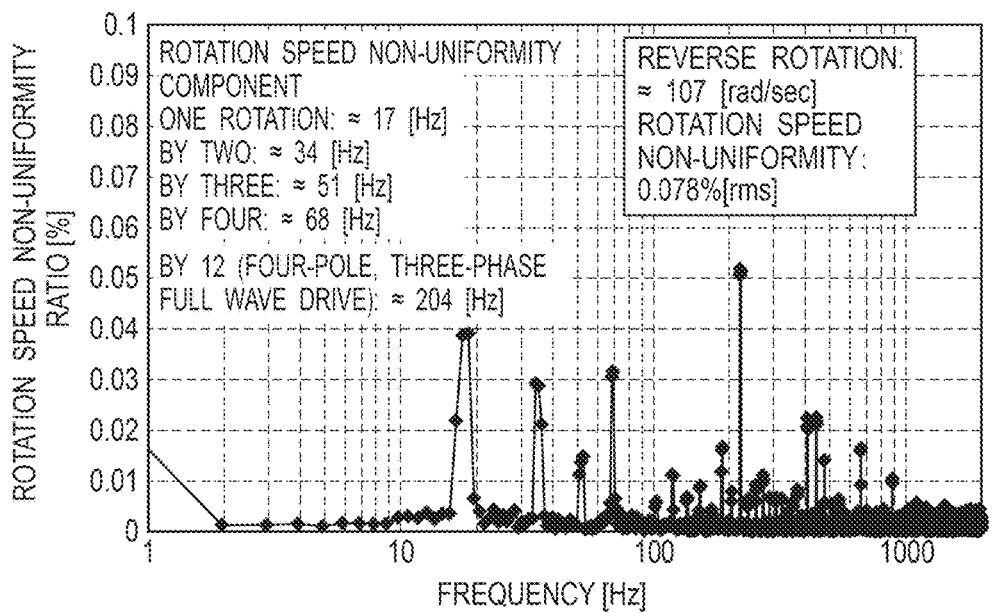
FIG. 22 is a graph illustrating a result obtained by performing the FFT analysis on the rotation speed non-uniformity ratio of FIG. 18.
Figure 23:
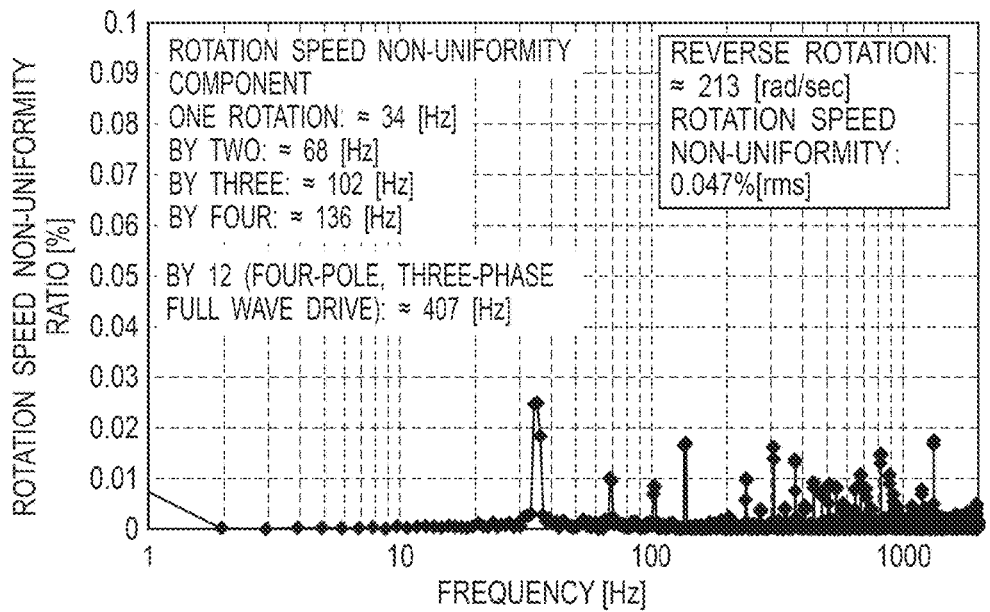
FIG. 23 is a graph illustrating a result obtained by performing the FFT analysis on the rotation speed non-uniformity ratio of FIG. 19.
Figure 24:
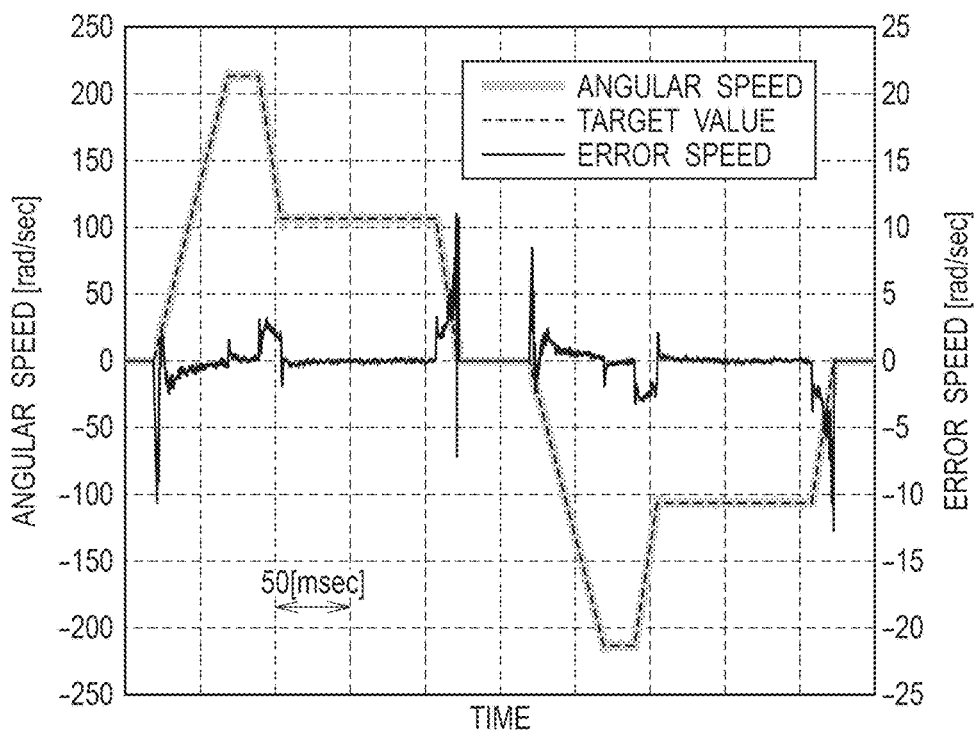
FIG. 24 is a graph depicting measured data of the angular speed of the motor and the error speed in a drive pattern A.
Figure 25:
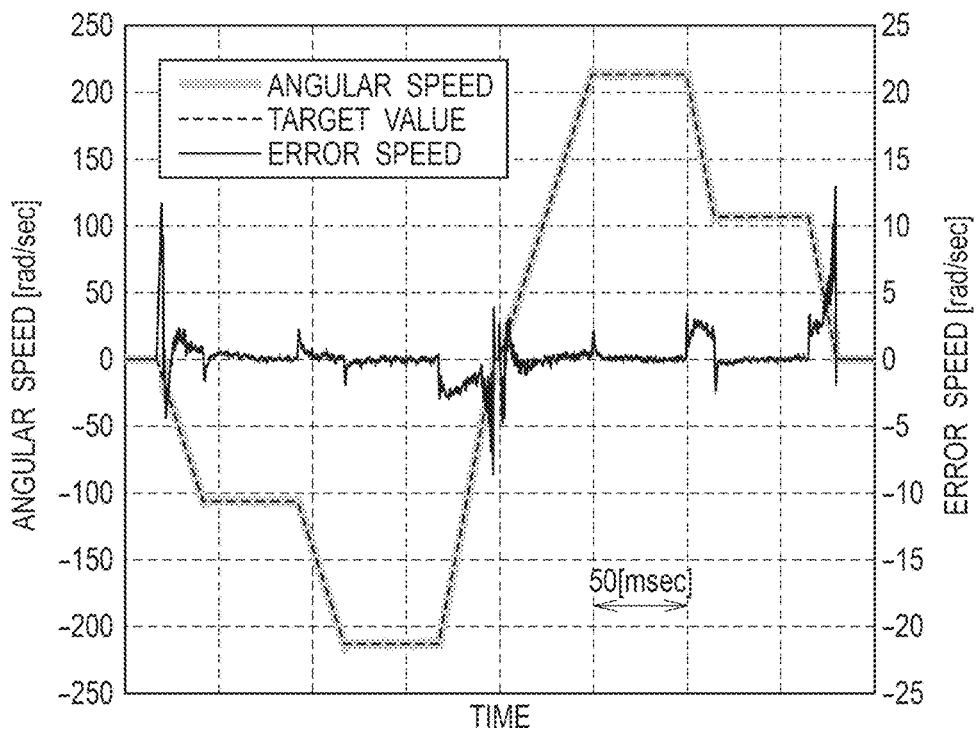
FIG. 25 is a graph depicting measured data of the angular speed of the motor and the error speed in a drive pattern B.
Figure 26:
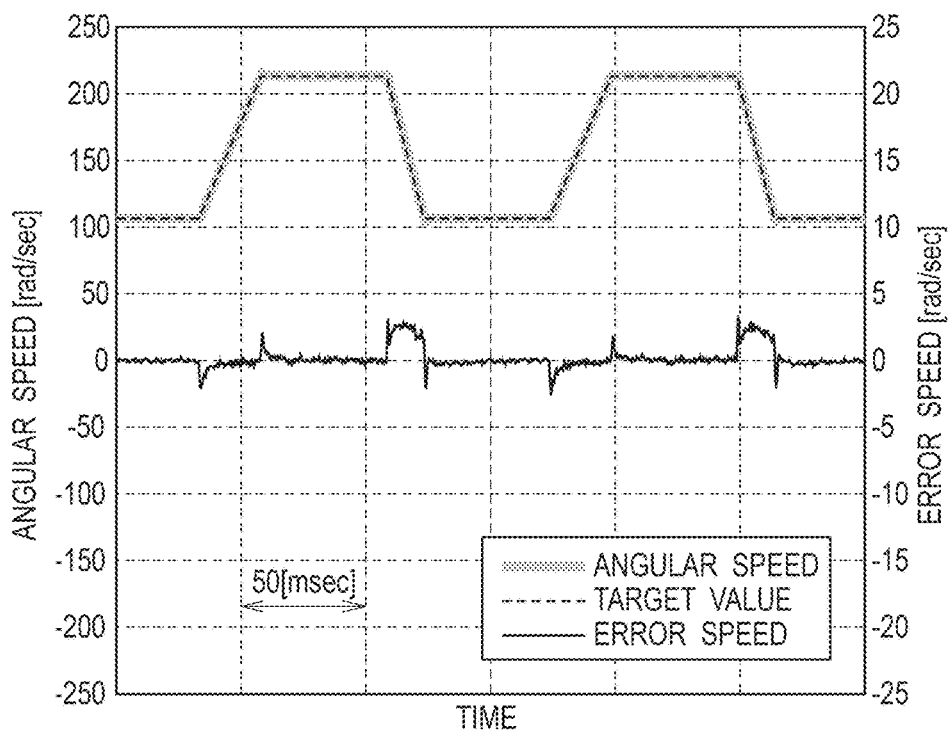
FIG. 26 is a graph depicting measured data of the angular speed of the motor and the error speed in a drive pattern C.
Figure 27:
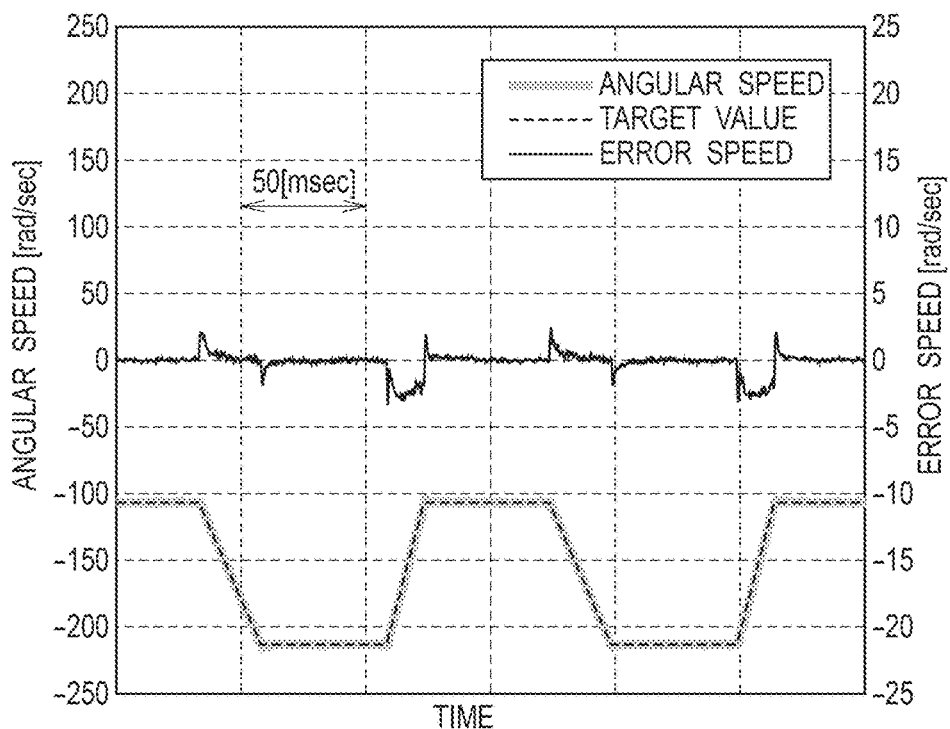
FIG. 27 is a graph depicting measured data of the angular speed of the motor and the error speed in a drive pattern D.
Figure 28:
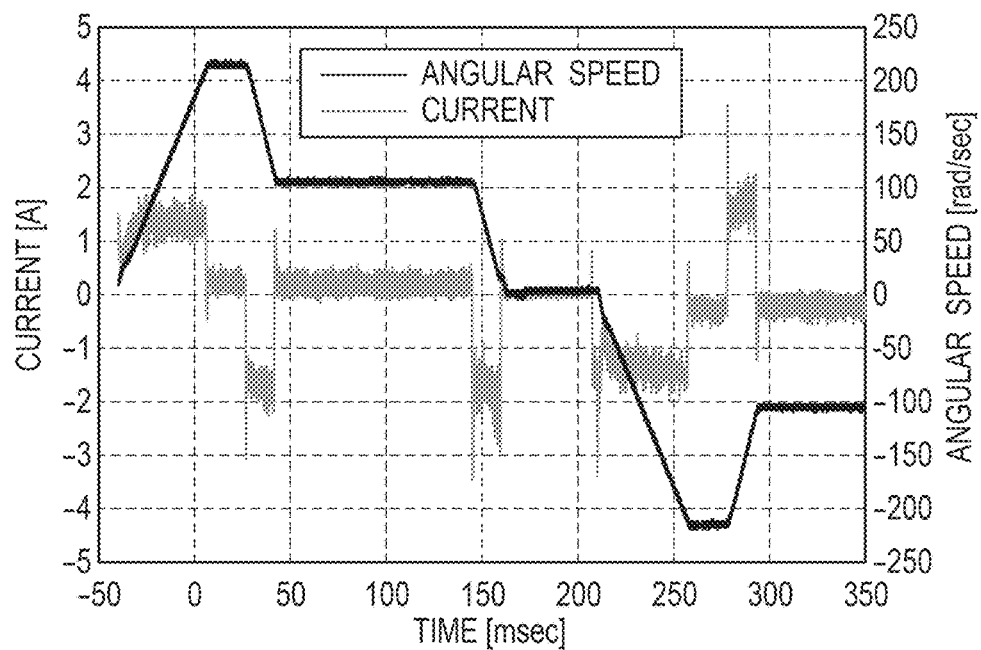
FIG. 28 is a graph depicting measured data of the current flowing in the motor in the drive pattern A.
Figure 29:
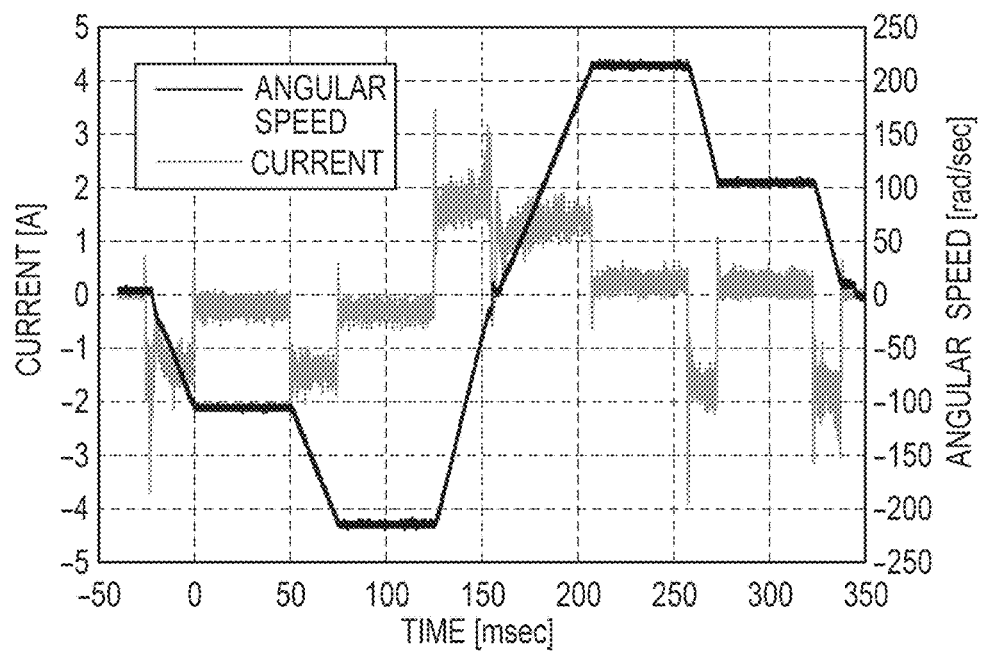
FIG. 29 is a graph depicting measured data of the current flowing in the motor in the drive pattern B.
Figure 30:
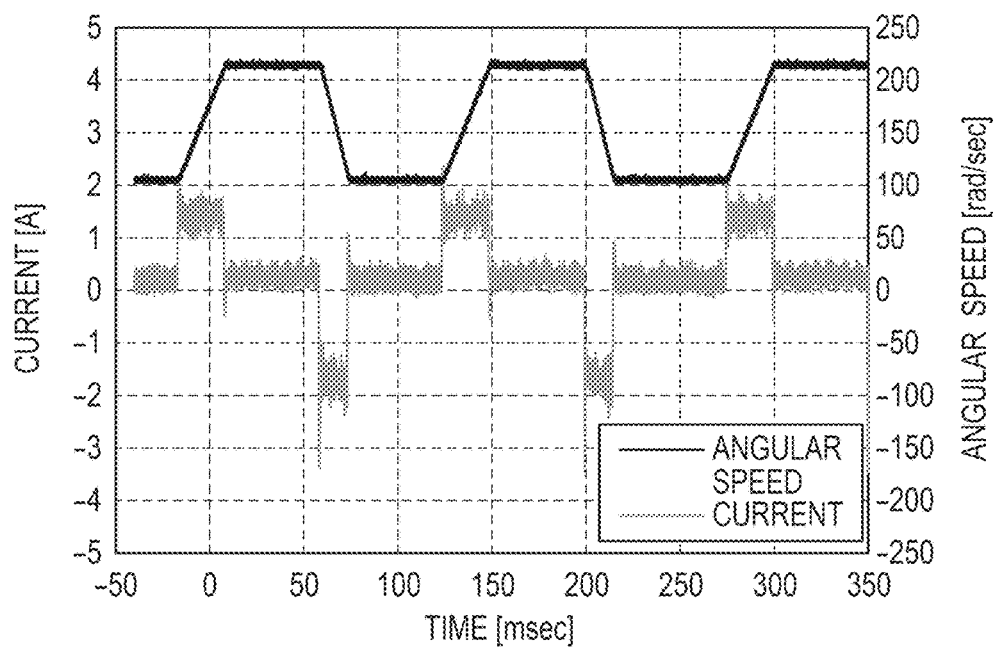
FIG. 30 is a graph depicting measured data of the current flowing in the motor in the drive pattern C.
Figure 31:
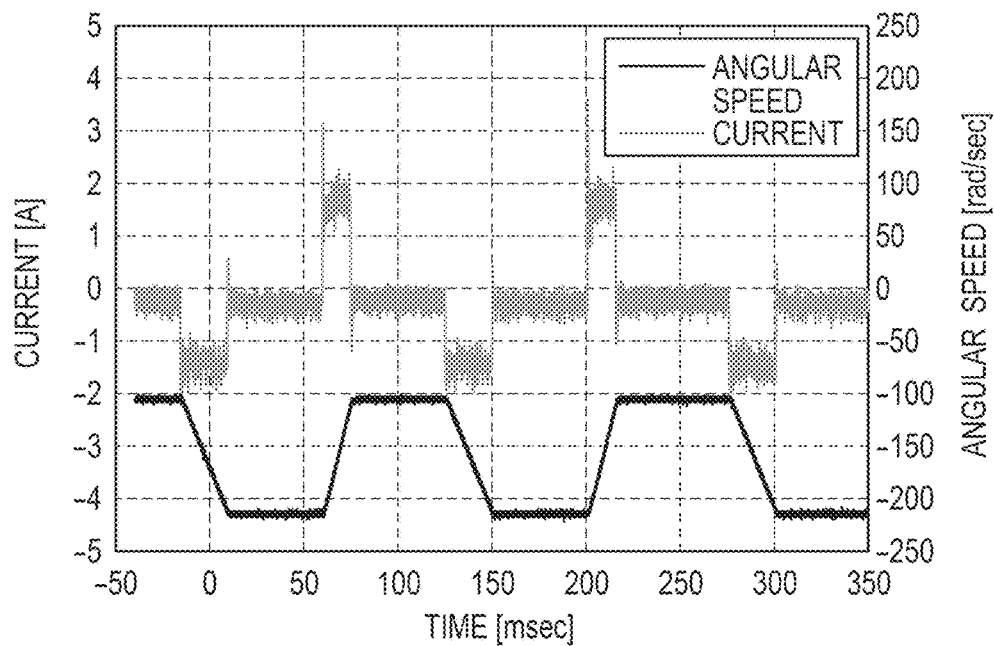
FIG. 31 is a graph depicting measured data of the current flowing in the motor in the drive pattern D.

As illustrated in FIGS. 20 and 23, it is confirmed that the rotation speed non-uniformity ratio Wow is equal to or less than 0.1% [rms] in both of the forward rotation and the reverse rotation when the angular speed ωm is equal to or greater than 100 rad/sec. As described above, in the drive control device 1, a highly-accurate rotation speed control performance is obtained.

Next, measured data of the angular speed ωm of the motor 6 and the error speed ωe in four types of drive patterns (drive patterns A to D) are depicted respectively in FIGS. 24 to 27. Moreover, measured data of the current Im flowing in the motor in the driver patterns A to D are depicted respectively in FIGS. 28 to 31.

The drive pattern A is a pattern in which the state of the motor 6 is switched from a forward rotation state to a stop state, and then to a reverse rotation state. The drive pattern B is a pattern in which the state of the motor 6 is switched from the reverse rotation state to an instantaneous stop, and then to the forward rotation state. The drive pattern C is a pattern in which the state of the motor 6 is switched between a high-speed forward rotation state and a low-speed forward rotation state. The drive pattern D is a pattern in which the state of the motor 6 is switched between a high-speed reverse rotation state and a low-speed reverse rotation state.

As depicted in FIGS. 24 to 31, a performance of high-speed response to the target speed command (target value ωr) which is performed in about 1 to several msec is obtained in all of the drive patterns A to D.

As described above, in the drive control device 1, the drive-voltage duty-ratio calculator 14 calculates the drive voltage of the motor 6 in the synchronous recertification method, based on the torque calculated by the PID adjuster 13, the rotation speed of the motor 6, and the electrical specification (electrical parameter) of the motor 6. Moreover, the drive-voltage duty-ratio calculator 14 sets the duty ratio of the PWM signal in the synchronous recertification method, based on the calculated drive voltage. The duty ratio corresponding to the error speed can be thereby set without forming a motor current negative feedback loop. Accordingly, in the drive control device 1, it is possible omit a current detector and an AD converter forming the motor current negative feedback loop and simplify the hardware configuration.

Since the inductance (armature winding inductance La) of the motor 6 is included in the electrical specification (electrical parameter) of the motor 6 used to calculate the drive voltage, the decrease in response performance due to the integral delay of the current caused by inductance can be suppressed.

Moreover, in the drive control device 1, the simple PWM generator 16 generates the PWM signal with the set duty ratio by comparing the carrier signal and the PWM setting value. Accordingly, there is no delay due to processing of detecting the current flowing in the motor and at the same time causing the duty ratio of the PWM signal to follow the current and converge, the delay occurring in the configuration using the motor current negative feedback loop.

Accordingly, the PWM signal can be generated in a short time. As a result, highly-accurate rotation speed control and quick response to the target speed command is made possible.

Moreover, in the drive control device 1, the entire control system can be digitized and a speed control (fully-digital programmable servo) system can be established by firmware with a high degree of freedom.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended, claims rather than by the foregoing description and all changes which come within the meaning and range of equivalency of the claims are therefore intended to be embraced therein.

Moreover, the effects described in the embodiments of the present invention are only a list of optimum effects achieved, by the present invention. Hence, the effects of the present invention are not limited to those described in the embodiment of the present invention.

What is claimed is:

1. A drive control device comprising:
   a speed detector configured to output a pulse signal corresponding to a rotation angle of a motor driven by a PWM control of a synchronous rectification type;
   a processor; and
   a memory including instructions that, when executed by the processor, cause the processor to perform operations including:
      obtaining the pulse signal outputted from the speed detector and measuring a cycle of the pulse signal;
      calculating a rotation speed of the motor based on the measured cycle of the pulse signal;
      comparing the calculated rotation speed of the motor and a target value of the rotation speed and calculating an error speed;
      calculating a torque required in the motor based on the calculated error speed;
      calculating a drive voltage of the motor in the synchronous rectification type based on the calculated torque, the calculated rotation speed of the motor, and an electrical specification of the motor; and
      setting a duty ratio of a PWM signal in the synchronous rectification type based on the calculated drive voltage.

2. The drive control device according to claim 1, wherein the electrical specification of the motor includes an inductance of the motor.

3. The drive control device according to claim 1, wherein the operations further include:
   generating a carrier signal; and
   generating a PWM signal with the set duty ratio by comparing the generated carrier signal and a PWM setting value corresponding to the drive voltage.

4. The drive control device according to claim 2, wherein the operations further include:
   generating a carrier signal; and
   generating a PWM signal with the set duty ratio by comparing the generated carrier signal and a PWM setting value corresponding to the drive voltage.

\* \* \* \* \*